E. C. BEVINS.
INFLATING COUPLING.
APPLICATION FILED SEPT. 20, 1920.

1,416,781.  Patented May 23, 1922.

Edward C. Bevins,
INVENTOR.

BY
Watson E. Coleman.
ATTORNEY.

UNITED STATES PATENT OFFICE.

EDWARD C. BEVINS, OF CLEVELAND, OHIO.

INFLATING COUPLING.

1,416,781.  Specification of Letters Patent.  Patented May 23, 1922.

Application filed September 20, 1920. Serial No. 411,396.

*To all whom it may concern:*

Be it known that I, EDWARD C. BEVINS, a citizen of the United States, residing at Cleveland, in the county of Cuyahoga and State of Ohio, have invented certain new and usful Improvements in Inflating Couplings, of which the following is a specification, reference being had to the accompanying drawings.

A purpose of this invention is to provide an improved inflating coupling for use at the terminal of a hose at an air service station for automobiles.

It is an object of the present invention to provide a very simple, efficient and practical inflating coupling capable of being manufactured for a relatively low cost and sold at a reasonable profit.

Another object is to provide an inflating coupling, wherein a spring tensioned valve is afforded, which is adapted to operate through a heavy rubber washer, when depressed by engagement with the inflating valve of an automobile tire, in order to cause communication between the air service hose and the inflating valve of the tire, said rubber washer adapted to close said communication, when pressure on the spring tensioned valve is relieved.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts as will be hereinafter set forth, shown in the drawings and claimed.

Figure 1:
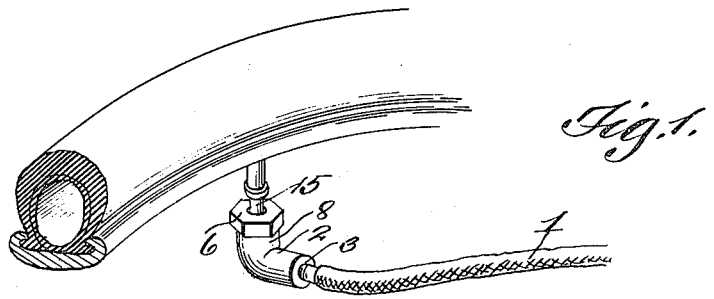
Figure 1 is a view in elevation of a portion of a service hose showing the inflating coupling connected thereto, and in engagement with the inflating valve of an automobile tire.
Figure 2:
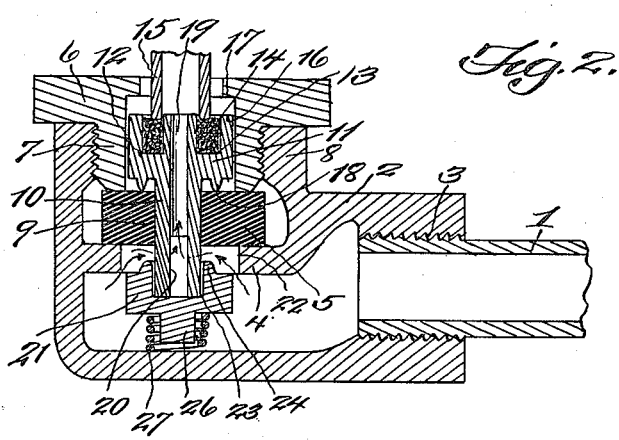
Figure 2 is a sectional view through the inflating coupling, showing the spring tensioned valve in engagement with the end of the inflating valve tube of the tire, when the spring tensioned valve of the coupling is depressed.
Figure 3:
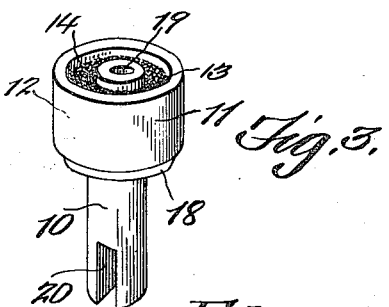
Figure 3 is a detail view of the spring tensioned valve.

Referring to the drawings, 1 designates a conventional form of operating service hose, and 2 denotes the casing of the inflating valve coupling, which is threaded as at 3 to the hose. The interior wall of the casing 2 has an annular flange 4, on which a heavy rubber washer 5 is seated. A cap 6 provided with a threaded extension 7 is provided. The extension 7 is threaded into the extension 8 of the casing 2. This extension 7 bears upon the heavy rubber washer thereby holding the same seated firmly upon the flange 4. This heavy rubber washer has a central opening 9, through which the tubular extension 10 of the spring tensioned valve 11 passes.

One end of the valve 11 has a cylindrical enlargement 12, which is provided with an annular channel 13. A packing 14 of any suitable material is arranged in the channel 13, and is adapted to engage the marginal edge of the terminal of the inflating valve tube 15 of the tire. The marginal edge 16 of the enlargement of the spring tensioned valve engages under a marginal flange 17 of the opening of the cap 6, thereby limiting the spring tensioned valve in its movement in one direction. The under surface of the enlargement of said spring tensioned valve has an annular rib 18, which contacts with the heavy rubber washer when the valve is depressed. The spring tensioned valve has a central duct 19 the lower end of which terminates in a slot 20. When the spring tensioned valve is limited in its movement by contact with the flange 17, the bottom of the slot 20 assumes a position substantially centrally of the thickness of the rubber washer, hence closing portions of the opposite open sides of the slot. An auxiliary valve 21 is mounted in the passage or opening 22 which is surrounded by the flange 4. This auxiliary valve 21 has a central cavity 23, which receives the lower end of the extension 10 of the spring tensioned valve. The upper marginal edge of the cavity 23 has a marginal rib 24, which contacts with the under surface of the washer 5, thereby acting to close communication between the air service hose and the inflating valve tube of the tire, when the spring tensioned valve is limited in its movement in one direction by contact with the marginal flange 17. The under face of the auxiliary valve 21 has a projection 26, in surrounding relation with which a spring 27 is arranged. This spring bears upon the wall of the casing 2 thereby holding the spring tensioned valve in contact with the flange 17 and at the same time holding the marginal rib of the auxiliary valve 21 in contact with the washer 5.

In the operating the inflating valve coupling is disposed so that the terminal of the inflating valve tube of the tire may bear upon the packing 24. Pressure is applied upon the coupling sufficient to cause the spring tensioned valve to move against the action of the coil spring 27, thereby not only disengaging the rib of the auxiliary valve from the washer 5, but also moving the extension 10 through the rubber washer 5 sufficiently to permit the bottom of the slot 20 to position more or less closely to the under face of the washer, allowing air from the service hose to pass through the slot, and thence through the duct and thence through the inflating valve tube of the tire, and, subsequently into the tire, thereby inflating the same. As soon as pressure is relieved on the casing of the inflating coupling, the spring tensioned valve will automatically resume its normal position, with the auxiliary valve 21 normally in engagement with the under face of the washer, thereby closing communication between the service hose and the tire.

The invention having been set forth, what is claimed as new and useful is:

1. In an inflating coupling, a casing having a valve chamber and provided with inlet and outlet ends, a pliable washer clamped in said chamber and having a central opening, an auxiliary valve mounted in the inlet end of said chamber and adapted to normally engage one face of the washer, means for holding the auxiliary valve against the washer, a main valve mounted for movement in the outlet end of said chamber and having a tubular extension guided by said opening through the washer and engaging into the auxiliary valve, whereby upon depressing the main valve the auxiliary valve will disengage from said washer, the tubular extension of the main valve terminating in a transverse slot communicating with the passage through the tubular extension, said slot adapted to normally position in the opening through the washer when the auxiliary valve is closed, and to position below the washer when the auxiliary valve disengages from the washer, to thereby open communication through said casing, and means for limiting the main valve in its movement in one direction when said main valve is allowed to assume its normal position.

2. In an inflating coupling, a casing having a valve chamber provided with a transverse wall having an opening therethrough, a pliable washer in said chamber engaging with the wall over the opening, a cap threaded in the casing and bearing upon and holding the washer against the wall, said washer having an opening, a spring tensioned auxiliary valve in the inlet end of the chamber and engaging through the opening in the wall whereby it may contact with the washer and close its opening, a main valve mounted in the cap and having a tubular extension guided by the opening through the washer and engaging into the auxiliary valve to disengage it from the washer, when the main valve is depressed, said tubular extension having a transverse slot at its end where it engages in the auxiliary valve, said slot normally positioning in the opening through the washer, whereby upon depressing the main valve, said slot becomes positioned below the washer, thereby opening communication between the service hose and the inflating valve tube of a tire.

In testimony whereof I hereunto affix my signature.

EDWARD C. BEVINS.